UNITED STATES PATENT OFFICE.

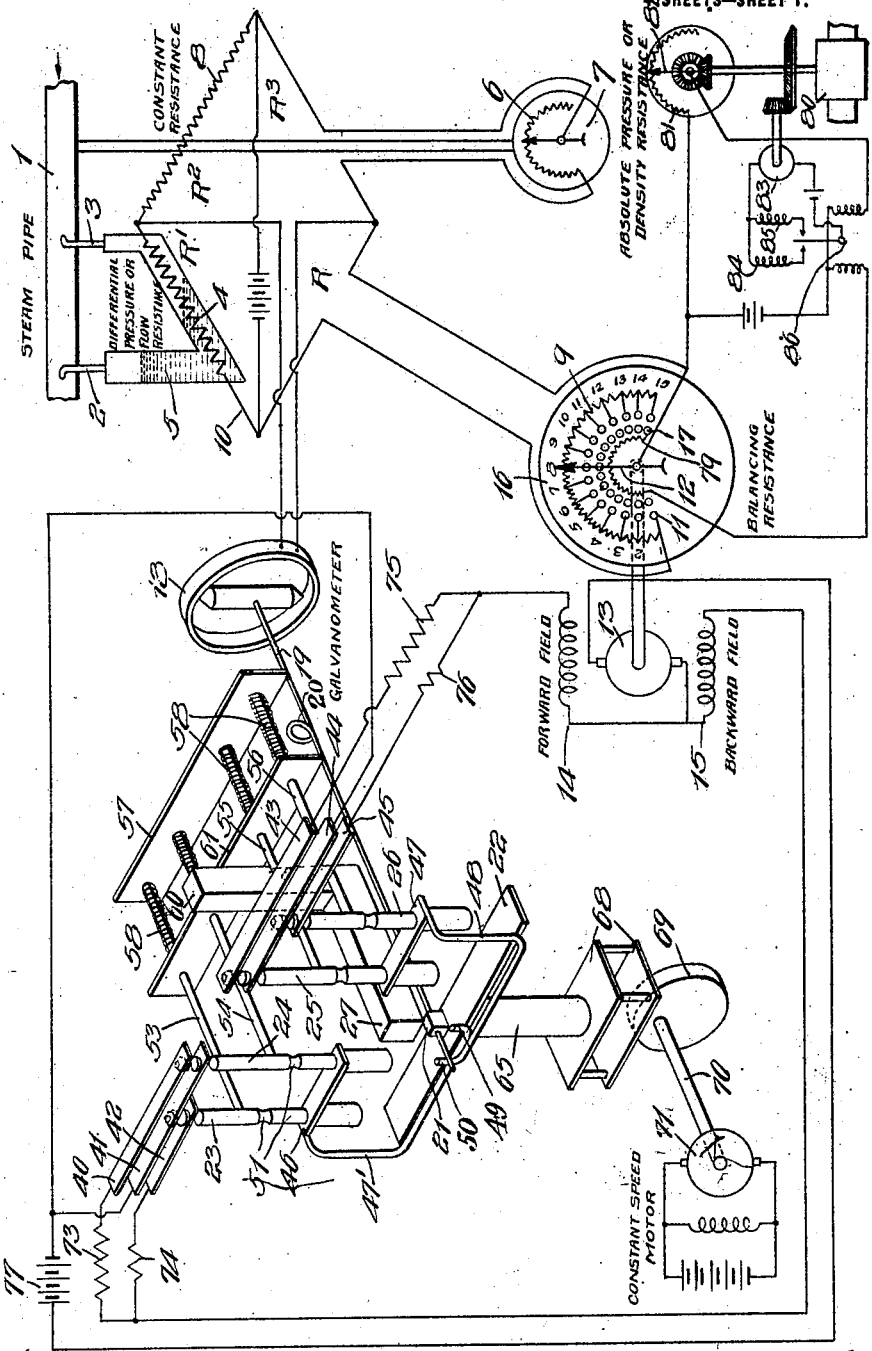

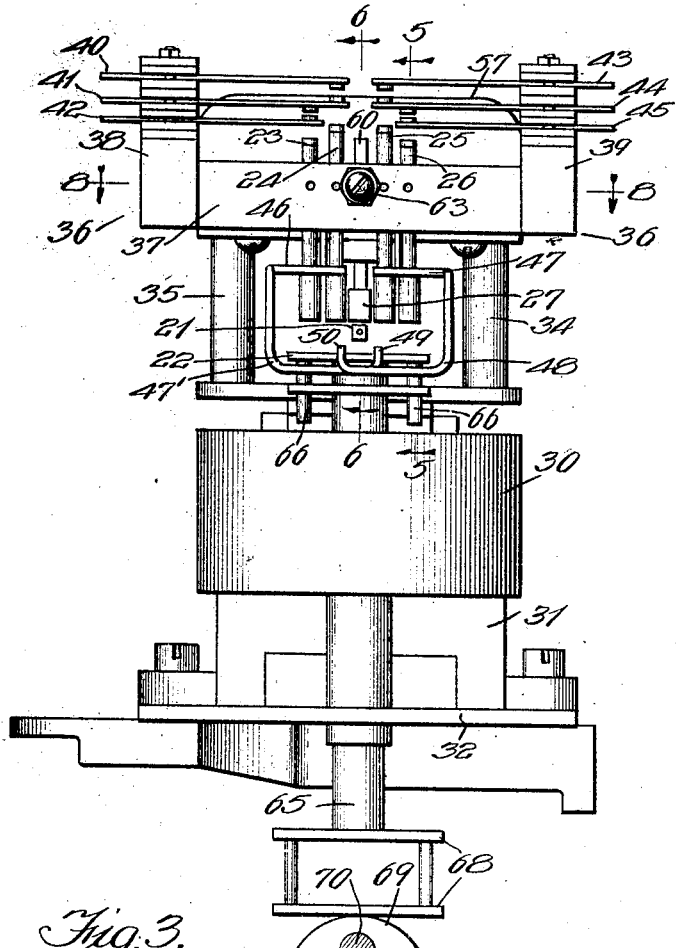
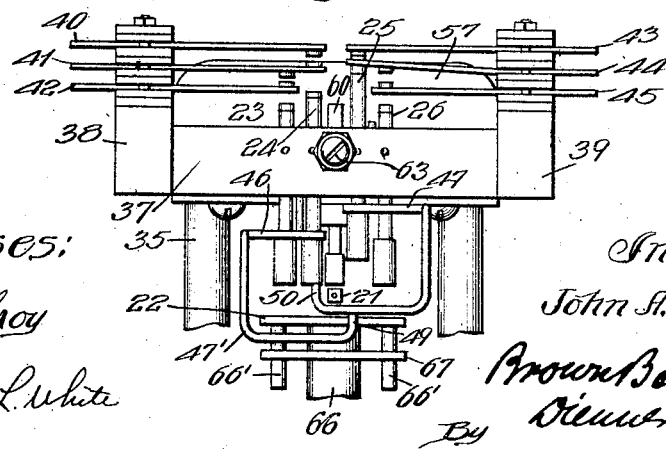

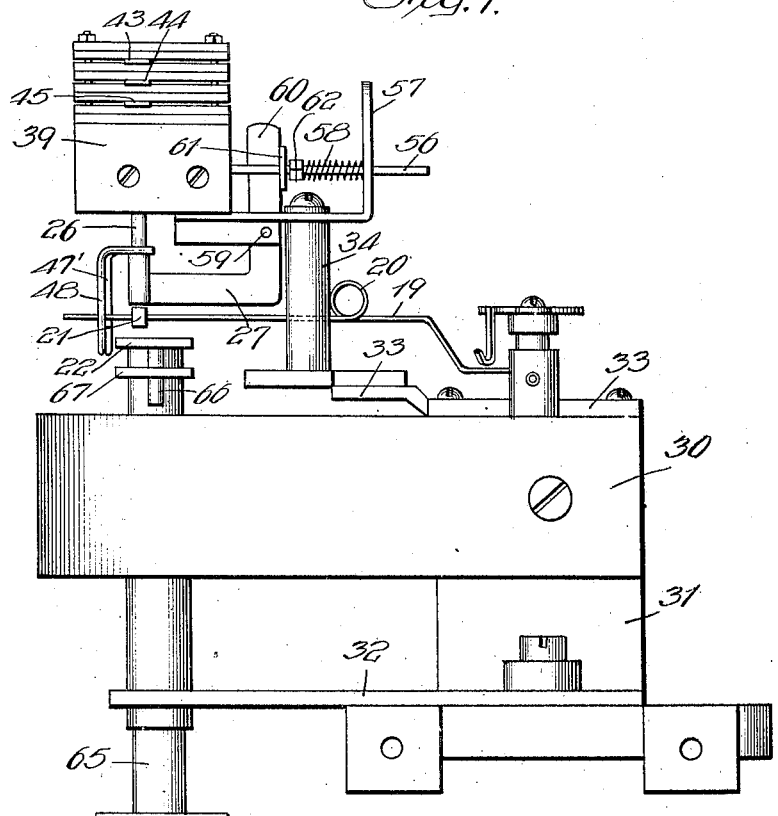
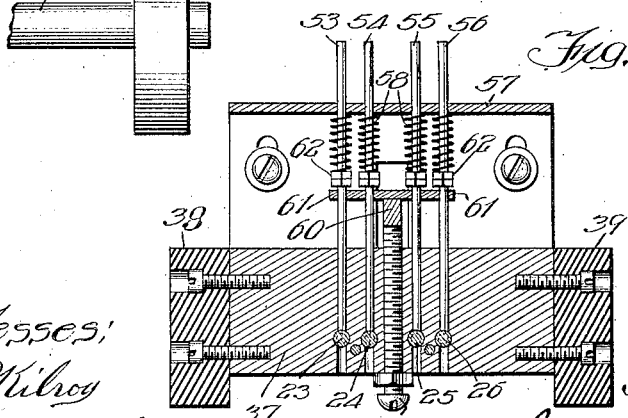

JOHN A. OBERMAIER, OF CHICAGO, ILLINOIS.

RELAY.

1,376,633.  Specification of Letters Patent.  Patented May 3, 1921.

Application filed April 5, 1920. Serial No. 371,527.

*To all whom it may concern:*

Be it known that I, JOHN A. OBERMAIER, a citizen of the United States, residing at Chicago, in the county of Cook and State of Illinois, have invented a certain new and useful Improvement in Relays, of which the following is a full, clear, concise, and exact description, reference being had to the accompanying drawings, forming a part of this specification.

My invention relates to controlling devices or systems of the character generally termed relays.

Consider a variable quantity or action, such for instance, as a variable pressure, temperature, motion, or any variable, physical, electrical, chemical, thermal or otherwise and assume that it is desired to cause a secondary action or variation which corresponds to, is in conformity with, in consequence of or a corrective for the primary variable. Such situations arise where it is desired to measure, indicate, record or integrate the variable under consideration, or where it is desired to operate a regulator or governor designed to keep as nearly constant as possible the primary variable or to keep a definite functional relation between a controlling factor and a resultant to be controlled.

My invention proceeds upon the theory that given a secondary constant action it may be made to become a variable in substantially exact conformity with the primary variable by modifying the constant action in accordance with the differential of increase or decrease of the primary variable when considered over short increments of time.

To carry out the theory in my invention I provide means responsive to the first differential of the variable with respect to time—in other words $\frac{dy}{dt}$ where $y$ represents the primary variable and $t$ represents the passing of time, and then provide means for setting up a constant secondary action which is varied in accordance with the differential for each increment or subdivision of time so that the secondary action instead of proceeding as a constant becomes variable in substantially exact conformity with the primary action or variable.

Theoretically it would be necessary to have means responsive to all values of the first differential of the variable, but in practice I find that such is not necessary and for all curves or variables in which the value of the first differential is relatively small, namely less than unity (positive or negative) two values (positive and negative) of differential are ample. In fact it is feasible to secure excellent results with two values of the differential (positive and negative) even on variables having relatively large values of the differential $\frac{dy}{dt}$.

In the simplest form of the invention I may employ a single value for all positive values of the differential and a single value for all negative values of the differential and then maintain the action at that value positive or negative as the case may be until the responsive device has overtaken the variation of the primary action. Under this scheme of operation it must invariably overtake the variation and in fact may overtake the variation by a small amount, but the responsive device will not cease to operate until the second or balancing action has overtaken the primary variation.

In the embodiment which I shall show and describe, this means that the electroresponsive device will remain active after a contact is once closed until sufficient change has been caused thereby to bring the pointer or member indicating a change of the primary variable back to the predetermined position of balance.

I shall now explain the invention, using a steam flow meter system as an embodiment of the invention, but I do not intend to limit the invention to meters or indicators as the invention is capable of use in many other situations such as regulators, governors and the like. In fact, I do not want to be bound to any particular use except as the same may be distinctly specified in the appended claims.

Figure 4:
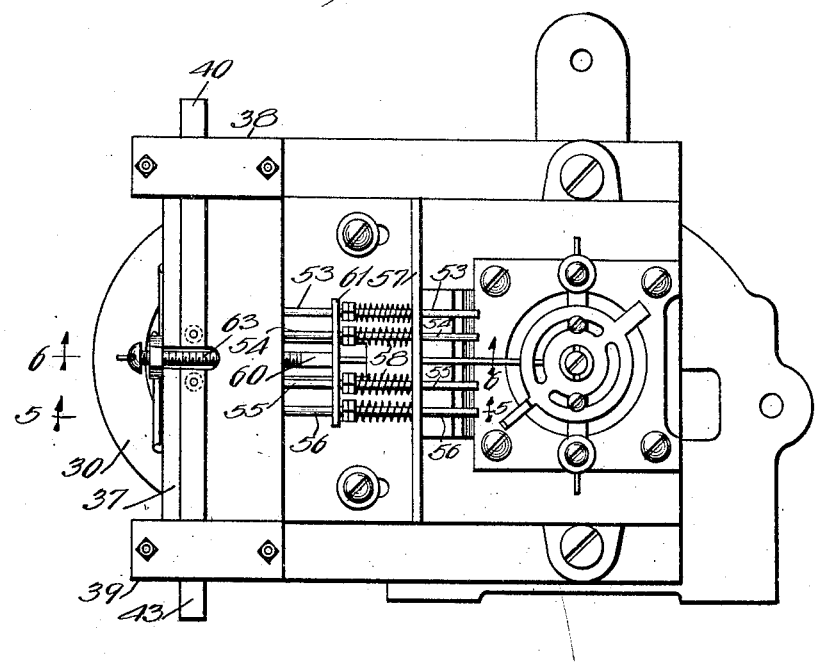
Fig. 4 is a top plan view of the device shown in Fig. 2.

In the accompanying drawings, in which I have illustrated one embodiment of my invention, Figure 1 is a diagrammatic layout of a steam flow meter installation embodying my invention;

Fig. 2 is a front elevational view of the differential evaluating or relay device;

Fig. 3 is a fragmentary elevational view similar to Fig. 2; showing the contact closed for a forward or positive movement of the secondary device or mechanism;

Fig. 5 is a section taken on the line 5—5 of Fig. 4 showing the detent means for maintaining the contacts in closed position for a predetermined period of time;

Figure 6:
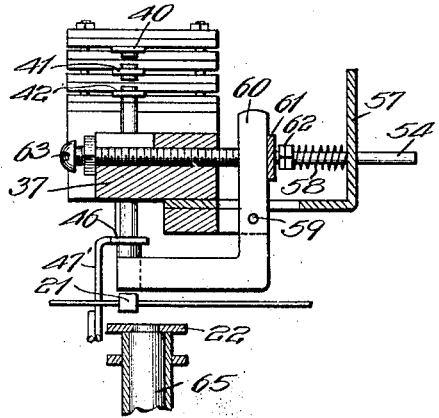

Fig. 6 is a vertical sectional view taken on the line 6—6 of Fig. 2;

Fig. 7 is a right side elevational view of the device shown on Fig. 2; and

Fig. 8 is a horizontal sectional view taken on the line 8—8 of Fig. 2.

Assume that it is desired to measure the flow of steam in a steam pipe such as that indicated at 1 in Fig. 1. A pair of Pitot tubes 2 and 3 are connected to the steam pipe 1, these Pitot tubes being connected by a U-shaped chamber which contains in one limb thereof the resistance 4, which is intended to be responsive to differential pressure between the tubes 2 and 3. This difference in pressure is equalized by the conducting liquid 5, which tends to short circuit to a greater or less degree the resistance 4.

The resistance 6 is controlled by the pressure gage 7 and hence is responsive to the absolute pressure of steam within the pipe 1. It will be understood that the gage 7 may be graduated in terms of density since density may be considered a function of pressure in the case of wet or dry saturated steam.

The resistance 8, which is placed in series with the flow controlled resistance 4 is made a constant but is adjusted to the proper value for the original setting of the Wheatstone bridge 10 in which these resistances are suitably arranged. The fourth resistance 9 is the balancing resistance. This resistance is provided with suitable contacts 11 adapted to be engaged by a moving member 12, such as a pointer or the like, this pointer being actuated in turn by a suitable electro-responsive device such as the electric motor 13 having the forward field 14 and the reverse field 15 controlling forward or reverse motion of the armature of the motor.

The pointer 12, in addition to making contact with the proper contacts 11 may move over the graduated scale 16 to give a visible indication, which indication is a resultant or evaluation of the factors which are considered or measured as will be described later. If it is desired to operate a suitable recording or integrating device, such purpose may be accomplished by means of the shaft of the motor or by contacts such as 17, which are auxiliary to the contacts 11. The resistances enumerated, namely, 4, 6, 8 and 9 are suitably arranged in a Wheatstone bridge as will be apparent from Fig. 1. Considering the resistance 4 as being represented by the symbol $R_1$, the resistance 8 as represented by the symbol $R_2$, the resistance 6 as being represented by the symbol $R_3$, and the balancing resistance 9 being represented by $R$, these resistances are arranged so that from the fundamental law of the Wheatstone bridge, we can deduce that the value of the balancing resistance is an indication of the value of the amount of steam flowing in the pipe 1. From the law of the Wheatstone bridge we know that $\frac{R}{R_3}=\frac{R_1}{R_2}$ and since $R_2$ has been made a constant, we may write the above equation as follows: $R=KR_1R_3$. This can readily be seen to be correct from the fact that the weight of steam which passes through the pipe 1 increases with the increased rate of flow and it increases with the pressure or the density of the steam passing therethrough. I have shown the resistances 4 and 8 as placed on the upper side of the Wheatstone bridge and the resistances 9 and 6 as placed on the lower side of the bridge with the galvanometer 18 connected between the two sides of the bridge to indicate when the bridge is in balance. It will at once be apparent that the variations in flow in the steam pipe 1 will be reflected by deflections of the pointer 19 of the galvanometer 18 either to the right or to the left and that this condition of balance can be maintained only by varying the resistance 9 in such a manner as to balance the combined variation in flow and in density in the pipe 1. This condition of balance is brought about particularly by the differentiating and contact making apparatus illustrated more in detail in Figs. 2 to 8, inclusive.

The function of this piece of apparatus is two-fold. First, it makes a test or measurement of the position of the pointer 19 at short intervals of time, which we may term increments of time, and second, it closes contact of an electric circuit through a graduated resistance for a predetermined interval of time in accordance with the position at which the pointer is found at the beginning or end of each individual period. This closure of the contact actuates the motor 13 or other electro-responsive device to vary the position of the contact-making pointer 12 so that the resistance 9 is varied in accordance with the variation of the resistances 4 and 6 to bring the bridge 10 to an approximate condition of balance. The throw of the pointer 19 in either a positive or negative direction determines or selects the corrective effort which is developed at the electro-responsive device 13 for bringing the bridge to balance through the proper variation of the resistance 9.

It will be understood that the particular differentiating and contact-making relay of my invention may be employed in systems other than the one that I have indicated in Fig. 1 and that the pointer 19 may be responsive to any variable whatsoever. In each case, however, it represents by its throw from the central or zero position the extent to which the variable has changed during a given increment of time and the contact which is selected sets into operation a certain force which is permitted to operate during the next increment of time to produce the secondary action which is in conformity with or a corrective of the primary action.

An important feature of the construction which I employ is concerned with the fact that the pointer 19 is not permitted to go from a positive swing to a negative swing, or vice versa, within any one increment of time. The pointer will be held at the zero position if there is a tendency to swing past zero, until the end of the period, whereupon it will be free to swing to the other side of the zero position, to select the required contact for bringing about the consequent or corrective effect. As shown in Figs. 2 to 8 inclusive, the pointer 19 comprises a thin flexible wire which is provided with a loop 20 to insure the desired flexibility without producing too great a strain upon the pivots of the pointer. The pointer is provided near its outer end with a small block 21 which is adapted to transmit the motion of the platen 22 to the desired one of the plungers 23, 24, 25 and 26, or the releasing trigger 27.

The pointer 19, in the form shown in Figs. 2 to 8, is controlled by a suitable galvanometer having the permanent magnet 30, which is mounted upon a brass frame member 31. This brass frame member 31 is in turn connected to a suitable base member or frame plate 32. Since the details of such a galvanometer construction are well known, I do not consider it necessary to describe the same in detail. The upper part of the galvanometer has a brass frame member 33 upon which is mounted by means of the posts 34 and 35, the contact mechanism 36. This mechanism comprises a central metallic frame or base member 37, to the ends of which are secured the blocks of insulation 38 and 39. The block 38 bears the insulated contact springs 40, 41 and 42, while the block 39 carries corresponding contact springs 43, 44 and 45. The contact making plungers 23, 24, 25 and 26 extend upwardly through the base member 37 into proximity with the corresponding contact springs above enumerated. These plungers 23, 24, 25 and 26 have enlarged heads at their lower ends, which terminate just above the block 21 on the pointer 19. A pair of control plates 46 and 47 are loosely mounted on the plungers 23—24 and 25—26 respectively. These control plates have extending arms 47 and 48 terminating in upwardly extending fingers 49 and 50 respectively. The purpose of these arms and fingers being to prevent the pointer or needle 19 from swinging past the center so long as any one plunger is in raised position.

Figure 5:
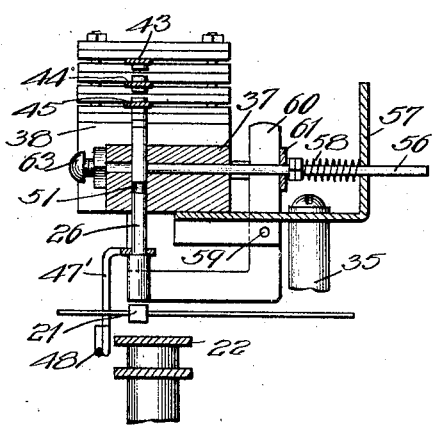

The plungers 23, 24, 25 and 26 are adapted to be held in raised position for at least a single period of time, the means for holding them thus raised being more clearly shown in Figs. 5 and 8. Each of the plungers 23, 24, 25 and 26 is provided with a notch 51, as is clearly shown in Fig. 5. A set of detent plungers 53, 54, 55 and 56 are guided in the block or base member 37 and in the guiding plates 57, in line with the plungers 23, 24, 25 and 26 with springs 58 for causing the ends of the detent plungers to enter the notches 51 when the corresponding contact controlling plunger is raised. Thus, for instance, assuming that the contact controlling plunger 25 is raised, it will be held in that position as shown in Fig. 3, by the detent plunger 55 entering into the notch 51 and holding the contact springs 43 and 44 closed until the releasing trigger 27 is operated. This trigger comprises a bell crank lever having its outer end 27 extending in line with the heads of the plungers 23, 24, 25 and 26. The pivot of the trigger is shown at 59 in Figs. 5 and 7. The rear end 60 of the trigger extends in front of a releasing plate 61 which is attached to the rear end 60, this releasing plate being adapted when the trigger 27 is raised, to force back all of the plungers 53, 54, 55 and 56 against the springs 58 to release any of the contact making plungers. The detent plungers 53, 54, 55 and 56 are provided with the shoulders or collars 62, which are engaged by the plate 61. The adjustment of the rear end 60 of the trigger 27 is controlled by the stop screw 63.

The platen 22 is mounted upon a plunger 65 and this plunger is guided in a suitable sleeve 66 secured to the base plate 32. This platen is guided by a pair of guides 66' which play in suitable openings in the guiding plate 67. The lower end of the plunger rod 65 is provided with a foot or tappet 68 which is engaged by a suitable cam 69, this cam being operated by a shaft 70 rotating at constant speed. The shaft 70 is preferably driven by a constant speed motor 71 which may be provided with a suitable speed governor as is well understood in the art.

The springs 40 and 42 are connected through resistances 73 and 74 respectively to the reverse field 15 of the motor 13. In a similar manner the contact springs 43 and 45 are connected through resistances 75 and 76 to the forward field 14 of the motor 13. The intermediate springs 41 and 44 are connected together through a suitable source of current 77, the other pole of which is connected to the free terminal of the motor 13.

The operation of the system and the relay is as follows: Assuming that the system is in operation, the constant speed motor 71 will vibrate the plunger 65 up and down at a rate dependent upon the desired increment of time. Upon each upward movement of the plunger 65 the platen 22 will engage the block 21, which is mounted upon the pointer 19. So long as the pointer remains at zero, or substantially zero position, the block merely engages a trigger 27 and the trigger is operated to thrust back the detent plungers 53, 54, 55 and 56 without any effect upon the rest of the mechanism. As soon as the pointer 19 is moved off of zero, as for instance by an increase in the differential pressure in the two tubes 2 and 3, due to an increased flow of steam in the pipe 1, the pointer 19 we will assume swings to the right as viewed in Figs. 1 and 2 due to the unbalancing of the Wheatstone bridge 10 and the consequent flow of current through the galvanometer 18. The result is that the pointer 19, with its block 21 swings under the head of the plunger 25 so that upon the next periodical rise of the platen 22 the plunger 25 will be forced upward so that the notch 51 of the plunger 25 comes in line with the detent plunger 55, whereupon the spring 58 of said detent plunger will force the end of the detent plunger 55 into the holding notch 51 holding the contact making plunger 25 in raised position. As the plunger 25 is moved upwardly it closes the upper contacts 43 and 44, whereby the circuit is closed through the forward field 14 and the resistance 75 for an interval of time equal to the period between throws of the cam 69 or a multiple thereof. The result is that the motor 13 will rotate in a forward direction a predetermined amount, whereby the indicator 12 moves in a forward direction indicating a greater flow of steam and at the same time increasing the value of the balancing resistance 9 in an effort to bring about a condition of balance of the bridge 10. It will be understood that the form of motor 13 may be varied, or that this motor may be connected through suitable gearing to the contact maker and indicator 12, as these details are not of the essence of the invention.

If the increase of resistance in the resistance 9 is great enough to bring the bridge to the balanced condition the point 19, upon being released, will swing back and approach the zero position at the end of the particular increment of time so that when the plunger 65 rises again the block 21 will lie under the trigger 27. The result will be that on the next rise of the plunger 65 the block 21 will be pressed against the trigger 27 and this trigger will be swung about its pivot to cause the releasing plate 61 to shove backwardly the holding plunger 55, releasing the contact making plunger 25.

Assuming that the advance in the indicating contact maker 12 was greater than required to bring the bridge to the balanced condition and caused a condition of unbalance whereby the pointer 19 would tend to swing to the left, as shown in Figs. 1 and 2. The pointer cannot swing past the central position because of the upraised finger 50, this finger being raised by upward movement of the plate 47, which in turn was moved upwardly by the contact making plunger 25 when it was raised to close the contacts 43 and 44. Consequently the pointer 19 is stopped at the central position until the plunger 65 rises again, whereupon the trigger 27 is raised and the plunger 25 released. Thereafter, on the lowering of the platen 22 the pointer 19 is free to swing to the left, whereupon it may pass under the head of the plunger 24 and cause closing of the contacts 40 and 41.

If after the pointer has swung to one side sufficiently to close the first set of contacts the increment of change is so great that the force which is set in operation is insufficient to equal the said increment, the pointer may swing farther and cause closure of the lower contact spring 42, or 45 as the case may be, whereby a greater force is set into operation to bring about the balancing of the bridge 10.

The Wheatstone bridge is, as I have indicated in my co-pending application, Serial No. 209,839, filed January 2, 1918, an ideal medium for the evaluation of a resultant which depends upon either the product or the quotient of two or more factors. The Wheatstone bridge may also be employed where only a single factor is to be taken into account, such, for instance, as temperature. As pointed out in my co-pending application above referred to, the typical Wheatstone bridge need not be employed in exactly the form shown in Fig. 1 as a balanced coil galvanometer may be employed as an equivalent thereof in some situations.

Furthermore, I do not wish to be limited to the precise constructions or connections which I have shown and described, but intend that all modifications which come within the teaching of my invention and the scope of the accompanying claims shall be held as mere variations.

I wish to call attention to the fact that while but two plungers are shown, it is possible to have either or both plungers raised at the same time so that in reality three possible steps are provided for with three possible variations of effect at the motor 13. Hence it will be apparent that for very short increments of time the three possible values of increment of the balancing resistance are ample.

By the controlling effect of the fingers 49 and 50 it is impossible to have both the forward and the reverse fields of the motor energized at the same time.

In the lower right hand portion of Fig. 1 I have indicated how the device of my invention may operate as a regulator for controlling any desired action, such for instance as the opening of the valve 80 in accordance with the indication given at 16 of the weight of steam flowing through the pipe 1 or the B. T. U. of the steam flowing in the pipe 1.

The contacts 17 control a resistance 79 in accordance with the movement of the pointer 12. As this resistance is compared with the resistance 81 which is varied by the position of a rheostat arm 82 in accordance with the setting of the valve 80.

A motor 83 having the forward field 84 and the reverse field 85 operates the valve 80 and the arm 82. The circuit of the motor is controlled by the differential galvanometer 86 which holds the circuit of the motor 83 open when the resistances bear a definite relation to each other, such for instance, as equality.

This differential galvanometer controls the contacts for the fields 84 and 85 through a relay such as illustrated for controlling the field of the motor 13. I have shown this circuit merely diagrammatically. The relay in this case operates in an ohmmeter system to balance one resistance with another.

Thus any desired secondary regulating action may be secured in conformity with the primary action under consideration.

I may also employ the motion developed at the shaft of the motor 13 for causing a certain mechanical action which will in turn set into operation forces for bringing to a predetermined position the pointer 19 which may be controlled by a primary action such, for instance, as pressure. That is to say, instead of securing the balancing action through an electric circuit I may secure the action by a mechanical thermal chemical or other connection.

I claim:

1. In combination, means responsive to a primary variable action, means for creating a secondary constant action approximately equal to said first action, means to vary said constant action at equal intervals of time, means governed by said first means and responsive to the difference between the secondary action and the primary action during each interval of time for governing the third means, whereby the second action is caused to vary substantially as the primary action.

2. In combination, a movable member responsive to the first differential of a primary variable with respect to time, an electric motor for causing a controlled secondary action, and means responsive to the position of said movable member for causing a predetermined flow of current through said motor to cause the variations of the secondary action in accordance with the primary variable.

3. In combination, a movable member responsive to the changes in value of a quantity over a given brief period of time, an electro-responsive device controlling a second movable member, and means governed by the movable member for each brief period of time to cause a predetermined quantity of current to flow through the electro-responsive device in accordance with the change in value of said quantity during said brief period of time.

4. The combination of a flow responsive device, a primary resistance controlled by said device, a balancing resistance, an electro-responsive device for varying said balancing resistance, a movable member governed by said resistances, means governed by the position of said member at equal time intervals of short duration for actuating said electro-responsive device to cause said balancing resistance to be suitably varied.

5. In combination, means responsive to a primary action, a primary resistance controlled by said means, a balancing resistance, an electro-responsive device for varying said balancing resistance, a movable member governed by said resistances, means governed by the position of said member at equal time intervals of short duration for actuating said electro-responsive device to cause said balancing resistance to be suitably varied.

6. In combination, a plurality of resistances responsive to a physical manifestation, a balancing resistance, an electro-responsive device for varying said balancing resistance, a movable member governed by said resistances jointly, means governed by the position of said member at equal time intervals of short duration for actuating said electro-responsive device to cause said balancing resistance to be suitably varied.

7. In combination, a primary resistance varied in accordance with a primary action, a balancing resistance, an electro-responsive device for varying said balancing resistance, a movable member governed by said resistances, means governed by the position of said member at equal time intervals of short duration for actuating said electro-responsive device and indicating means governed by said electro-responsive device for giving an indication of said primary action.

8. In combination, a primary resistance varied in accordance with a primary action, a balancing resistance, an electro-responsive device for varying said balancing resistance, a movable member governed by said resistances, means governed by the position of said member at equal time intervals of short duration for actuating said electro-responsive device, and measuring means for measuring the primary action.

9. In a relay device, a plurality of circuit controlling contact members, a swinging member adapted to select one of said devices, means for periodically actuating the selected device, and means for holding said contact controlling device in actuated position for a predetermined interval of time or a multiple thereof.

10. In combination, a movable pointer, an electro-responsive device, a circuit closer for operating said electro-responsive device in a forward direction, a second circuit closer for operating the electro-responsive device in the reverse direction, means for periodically testing for the position of the pointer with regard to said circuit closer at equal intervals of time, means for holding said circuit closers in closed position for a full period of time, and common means for releasing all of said circuit controllers.

11. In combination, a pair of switch members, means for holding the switch members in closed position, means for releasing said switch members from said holding means, a movable member to select said switch members or said releasing means, and periodically actuated means for operating either of said switching means or said releasing means.

12. In combination, a pair of contacts, a plunger for operating said contacts, a detent for holding said plunger when the contacts are closed, a trigger for releasing said detent, a movable pointer for selecting either the plunger or the trigger, and periodically actuated means for operating said plunger or said trigger through the agency of said pointer.

13. In combination, a pair of switch controlling plungers each of said plungers being adapted to control an electric circuit, detent means for holding the plungers in actuated position, a trigger having its operating ends interposed between the ends of the plungers and being adapted to release said plungers from said detent means, a periodically actuated element adjacent said plungers and said trigger and a movable pointer carrying a link adapted to connect said periodically actuated means with either of said plungers or with said trigger.

14. In combination, a pair of switch controlling plungers each of said plungers being adapted to control an electric circuit, detent means for holding the plungers in actuated position, a trigger having its operating ends interposed between the ends of the plungers and being adapted to release said plungers from said detent means, a periodically actuated element adjacent said plungers and said trigger, a movable pointer carrying a link adapted to connect said periodically actuated means with either of said plungers or with said trigger, and means for preventing said movable member from moving past the trigger when one of the plungers is actuated.

15. In combination, an electro-responsive device, a circuit including a larger resistance and a circuit including a smaller resistance for operating said electro-responsive device in a forward direction, a circuit including a larger resistance and a circuit including a smaller resistance for operating said electro-responsive device in the reverse direction, a movable member such as a pointer for selecting the desired circuits forward or reverse, periodically actuated means for closing the desired circuits, means for holding the desired circuits closed for a predetermined interval of time.

16. In combination, an electro-responsive device, a circuit including a larger resistance and a circuit including a smaller resistance for operating said electro-responsive device in a forward direction, a circuit including a larger resistance and a circuit including a smaller resistance for operating said electro-responsive device in the reverse direction, a movable member such as a pointer for selecting the desired circuits forward or reverse, periodically actuated means for closing the desired circuits, means for holding the desired circuits closed for a predetermined interval of time, and means for preventing the closing of a forward and a reverse circuit at the same time.

17. In combination with a member movable in response to a change to be recorded of an indicator, an electro-responsive device for moving said indicator, and periodically operated means controlled by said movable member for energizing said electro-responsive means.

18. The combination with a member movable in response to a change to be recorded of an indicator, an electro-responsive device for moving said indicator, and electric current supplying means controlled by said movable member for transmitting predetermined quantities of current to said electro-responsive device.

19. The combination with a member movable in response to a change to be recorded of an indicator, a normally open circuit between a source of current and an electro-responsive device for operating said indicator, and switching means controlled by said movable member for closing said circuit for a predetermined period of time.

20. The combination with a member movable in response to a change to be recorded of an electrical indicator, an electro-responsive device for moving said indicator, circuit controlling means periodically engaging said movable member when deflected for causing current to flow through said electro-responsive device.

21. In combination with a member movable in response to a change to be recorded of an electro-responsive device, a normally open circuit between a source of current and said electro-responsive device, means controlled by said movable member for periodically closing said circuit and a detent for holding the circuit closed.

22. The combination with a member movable in response to a change to be recorded of an indicator, electro-responsive means controlled by said movable member for moving said indicator through different definite distances, depending upon the time it takes for said movable member to return to its balanced position.

23. In combination with a member movable in response to a change to be recorded of an indicator, periodically operated means controlled by said movable member for controlling an electric circuit governing said indicator, and means controlled by said movable member for causing the movement of said indicator through different distances depending upon the extent of deflection of said movable member.

24. The combination with a member movable in response to a change to be recorded of an indicator, an electro-responsive device, a normally open circuit between a source of current and said electrical response device periodically operating, means coöperating with said movable member for periodically closing said circuit, and means controlled by said movable member for determining the strength of current passing through said electro-responsive device and the consequent distance of movement of said indicator.

25. The combination with a member movable in response to a change to be recorded of an indicator, an electro-responsive device, a normally open circuit between a source of current and said electro-responsive device, a plurality of means controlled by said movable member for closing said circuit for definite periods of time but of various strengths of current and means for selecting a circuit closing means in accordance with the extent of deflection of said movable member.

26. The combination with a member movable in response to a change to be recorded of an indicator, an electro-responsive device, a source of current, a plurality of resistances between said source and said electric-responsive device, circuit closing means for connecting different resistances in said circuit for causing different degrees of movement of said indicator, and means controlled by said movable member for selecting a circuit closer in accordance with the extent of deflection of said movable member.

27. The combination with a member movable in response to a change to be indicated of an indicator, a source of current, a circuit between said source and said indicator, a plurality of contacts for said circuit for causing different actions of said indicator, and means controlled by said movable member for selecting a circuit closer in accordance with the extent of the deflection of said movable member.

28. The combination with a member movable in response to a change to be recorded, of an indicator, a periodically operated actuating member, said movable member when deflected being engaged by said actuating member, a suitable source of current and an electro-responsive device to move said indicator when said movable member is deflected.

29. The combination with a member movable in response to a change to be measured, of a measuring device, an electro-responsive device, a plurality of contacts, a periodically operated member for engaging said movable member to operate said contacts, said periodically operated member being adapted to close the contacts selected by the degree of deflection of said movable member and the extent of actuation of said electro-responsive device for moving said measuring device being dependent upon the degree of movement of said member.

30. The combination with a member movable in response to a change, of a translating device, electro-responsive means for moving said translating device and periodically operated means coöperating with said movable means for connecting said electro-responsive device to a suitable source of current.

31. In combination with a member movable in response to a change, of a translating device, an electro-responsive device for moving said translating device, means periodically engaging said movable member and circuit-controlling means for said electro-responsive device governed by said movable member when engaged by said periodically operated means for causing the response of said electro-responsive device.

32. The combination with a member movable in response to a change, of a translating device, a normally open circuit containing a suitable source of current, an electro-responsive device, and a plurality of current controlling devices periodically operating means coöperating with said movable member for closing said circuit through one of said controlling devices.

33. The combination with a member movable in response to a change, of a translating device, an electro-responsive device for operating said transmitting device and means controlled by said movable member for transmitting a predetermined amount of current through said electro-responsive device for moving said translating device to different definite distances depending upon the extent of movement of said movable member.

34. The combination with a member movable in response to a change, of a translating device, an electro-responsive device for said translating device, a normally open circuit between a source of power and said translating device, a plurality of circuit closers controlled by said movable member for closing said circuit for a given period of time to transmit impulses of different current strength, means for selecting the circuit closing means in accordance with the extent of movement of said movable member.

35. The combination with a movable member of an electrical translating device, a source of current, a series of current controlling devices for causing different degrees of movement of said translating device, and means controlled by said movable member for selecting a circuit controller in accordance with the extent of deflection of said movable member.

36. The combination with a movable member of an electro-responsive device, a normally open circuit, a source of current, a plurality of contacts for connecting the electro-responsive device to said source in a forward or reverse direction, and periodically operated means coöperating with said movable member for closing one of said contacts for a predetermined period of time.

37. The combination with a member movable in response to a change to be recorded, of an indicator, an electro-responsive device for moving said indicator, and an electric circuit adapted to be closed through said device under the control of said movable member, when deflected.

38. The combination with a member movable in response to a change of an electro-responsive device, a source of current normally disconnected from said electro-responsive device and a periodically operated member coöperating with said movable member for connecting said source of current with said electro-responsive device for a predetermined short period of time.

39. The combination with a member movable in response to a change of an electro-responsive device, a source of current normally disconnected from said electro-responsive device, current modifying means for connecting said source of current with said electro-responsive device, and a periodically operated member coöperating with said movable member for governing the operation of said current modifying devices.

40. The combination with a member movable in response to a change, of a transmitting device, an electro-responsive device for operating said transmitting device, a normally open circuit between a source of current and said electro-responsive device, circuit closing means comprising means for controlling the strength and direction of the current and a periodically operated member coöperating with said movable member for controlling said circuit closing means.

41. The combination with a member movable in response to a change, of an electro-responsive device, a source of current, a periodically operated member adapted to engage said movable member, means controlling the direction and strength of the current applied to said electro-responsive device, said last means coöperating with said operating member for controlling said electro-responsive device.

42. The combination with a member movable in response to a change, of a translating device, an electro-responsive device controlling said translating device, a source of current, a periodically operated member adapted to connect said source of current to said electro-responsive device, and means controlled by said periodically operating member and said movable member governing the direction and strength of the current passing through said electro-responsive device.

43. The combination with a member movable in response to a change, of a translating device, an electro-responsive device controlling said translating device, a source of current a periodically operating member adapted to connect said source of current to said electro-responsive device, means controlled by said operating member and said movable member for governing the direction and strength of the current passing through said electro-responsive device, and means for interrupting the flow of current before the same is reversed.

44. In combination, a movable member responsive to a change, an electro-responsive device, a source of current for said electro-responsive device, circuit controlling means governing the application of current in one direction through said electro-responsive device, circuit controlling means governing the flow of current through said electro-responsive device in the opposite direction, and means under the control of said movable member for closing one of said circuit controlling means for a predetermined period of time.

45. In combination, a movable member responsive to a change, an electro-responsive device, a source of current for said electro-responsive device, circuit controlling means governing the application of current in one direction through said electro-responsive device, circuit controlling means governing the flow of current through said electro-responsive device in the opposite direction, means under the control of said movable member for closing one of said circuit controlling means, for a predetermined period of time, and means for interrupting the flow of current through said electro-responsive device for a predetermined period before the current is reversed through said electro-responsive device.

46. In combination, a movable member responsive to a variable to be indicated, an electro-responsive device, a plurality of contacts controlling the direction and current strength through said electro-responsive device, a periodically actuated member for operating said circuit closing devices, said movable member being adapted to form connecting means between said periodically actuated member and the selected circuit closing device.

47. In combination, a movable member responsive to a variable to be indicated, an electro-responsive device, a plurality of contacts controlling the direction and current strength through said electro-responsive device, a periodically actuated member for operating said circuit closing devices, said movable member being adapted to form connecting means between said periodically actuated member and the selected circuit closing device, and means for invariably holding the actuated circuit closing device in closed position for a predetermined period of time.

48. In combination, a movable member responsive to a variable to be indicated, an electro-responsive device, a plurality of contacts controlling the direction and current strength through said electro-responsive device, a periodically actuated member for operating said circuit closing devices, said movable member being adapted to form connecting means between said periodically actuated member and the selected circuit closing device, means for invariably holding the actuated circuit closing device in closed position for a predetermined period of time, and means for insuring that the circuit will be open for a predetermined period of time before the current is reversed through the electro-responsive device.

49. The combination with a member movble in response to a change of an electro-responsive device, a constant speed shaft, a periodically operated member adapted to engage said movable member and a series of contact closing devices operated by said periodically operated member and controlled by said movable member for connecting a source of current to said electro-responsive device.

50. The combination with a member movable in response to a change, of an electro-responsive device, a source of current, a periodically operating platen member, a series of contact plungers having circuit closing means adapted to be engaged by said movable member upon the rise of said platen member, and means controlled by said circuit closing members for connecting a source of current with said electro-responsive device to give the desired strength and direction of current through said electro-responsive device.

51. The combination with a member movable in response to a change, of an electro-responsive device, a source of current, a periodically operating platen member, controlling means for connecting said source of current with said electro-responsive device, said periodically operating member being adapted to engage said movable member at different positions dependent upon the extent of deflection of said movable member, whereby said electro-responsive device is connected for predetermined periods of time with said source of current to receive different current strengths.

52. The combination with a member movable in response to a change, of an electro-responsive device, a source of current, a periodically operating member, means for connecting said electro-responsive device with said source of current controlled by said periodically operating member, said periodically operating member being adapted to engage said movable member, said connecting member having connections adapted to transmit current of varying strengths depending upon the extent of deflection of said movable member.

53. The combination with a member movable in response to a change of an electro-responsive device, a source of current, a periodically operating member, means for connecting said electro-responsive device with said source of current controlled by said periodically operating member, said periodically operating member adapted to engage said movable member, said connecting means having electrical contacts adapted to transmit current of different direction and strength, depending upon the direction of deflection and the extent of deflection of said movable member respectively.

54. The combination with a member movable in response to a change of an electro-responsive device, a source of current, a periodically operating plunger having a platen adapted to engage said movable member, a plurality of contact making plungers controlling contacts for making the source of power in different directions or through different resistances to said electro-responsive device depending upon the direction and extent of deflection of said movable member.

55. The combination with a member movable in response to a change of an electro-responsive device, a source of current, a periodically operating plunger having a platen adapted to engage said movable member, a plurality of contact making plungers controlling contacts for making the source of power in different directions or through different resistances to said electro-responsive device depending upon the direction and extent of deflection of said movable member, and means for holding the contact making plungers in contact making position for a predetermined period of time or a multiple thereof.

56. The combination with a member movable in response to a change of an electro-responsive device, a source of current, a periodically operating plunger having a platen adapted to engage said movable member, a plurality of contact making plungers controlling contacts for making the source of power in different directions or through different resistances to said electro-responsive device depending upon the direction and extent of deflection of said movable member, means for holding the contact making plungers in contact making position for a predetermined period of time or a multiple thereof, and means for insuring a period of no current flow before the direction of current is reversed through the electro-responsive device.

57. The combination with a member movable in response to a change, of an electro-responsive device, a source of current, a normally open circuit between said source and said device, means adapted to engage said movable member for closing said circuit, said means comprising a plurality of contacts and being adapted to disengage said movable member before said contacts are opened.

58. The combination with a member movable in response to a change, of an electro-responsive device, a source of current, a normally open circuit between said device and said source, a plurality of contact making devices for closing said circuit, means adapted to engage said movable member for operating said devices, said means being disengaged from said movable member before said circuit closing devices are opened.

59. The combination with a member movable in response to a change, of an electro-responsive device, a source of current, a normally open circuit between said source and said device, circuit closing members, a plurality of actuating members for said circuit closing members, and a member controlling said actuating members and adapted to engage said movable member, and means for holding said actuating members in closed position for a predetermined period of time.

60. The combination with a member movable in response to a change, of an electro-responsive device, a source of current, a normally open circuit between said source and said device, a circuit closing member, a detent therefor, and a member controlling said circuit closing member and adapted to engage said movable member, said latter member when engaging said movable member shifting said circuit closing member under the control of said detent to retain said circuit closing member in closed position for a predetermined period of time.

61. The combination with a member movable in response to a change, of an electro-responsive device, a source of current, a normally open circuit between said source and said device, a plurality of circuit closing devices adapted to transmit current in predetermined quantity and direction to said electro-responsive device in accordance with the deflection of said movable member, a constant speed member and an actuating member operated by said constant speed member to engage said movable member and close said circuit closing devices for a predetermined period of time.

62. The combination with a member movable in response to a change, of an electro-responsive device, a source of current, a plurality of resistances, contacts for connecting said resistances in series with said source of power and said device, and means controlled by said movable member for operating said switching means to connect said electro-responsive device through one of said resistances to said source of current.

63. The combination with a member movable in response to a change, of an electro-responsive device, a circuit for said device comprising a source of power, switching means for connecting said source of power in the desired direction to said electro-responsive device, and resistance means controlled by said switching means and a periodically operated member adapted to engage said movable member to actuate the selected switching means.

64. The combination with a member movable in response to a change, of an electro-responsive device, a source of current, a circuit, a plurality of resistances, switching means for selectively connecting the source of current through one of said resistances in proper direction to said device, and a periodically operating member adapted to engage said movable member for selecting the switching member.

65. The combination with a member movable in response to a change, of an electro-responsive device, a normally open circuit for said device, a continuously rotating member, mechanically operated switching members for said circuit, and means comprising a plunger operated by said rotating member adapted to engage said movable member for operating said mechanical switch controlling devices.

66. The combination with a member movable in response to a change, of an electro-responsive device, a continuously rotating shaft, a plurality of switching devices, a periodically operated platen member operated by said shaft, said movable member comprising a link between the platen and the switching devices for operating one of said switching devices, and means for holding the switching devices in operative position for a predetermined period of time.

67. The combination with a member movable in response to a change, of electro-responsive means, a continuously rotating member, a plurality of switching members for controlling a circuit through said electro-responsive means, a platen operated by said continuously rotating member, there being a gap between said platen and said switching members, said movable member closing said gap and means for holding said switching means closed for a predetermined period of time.

68. In combination, a movable member responsive to a change, an electro-responsive means, means for transmitting a predetermined quantity of current through said means in one direction, means for transmitting a predetermined quantity of current through said means in the opposite direction, and means for holding the circuit of the electro-responsive device open for a predetermined period of time before the current is reversed.

69. The combination with a member movable in response to a change to be measured, of an electro-responsive device, a circuit closing member for said electro-responsive device, a continuosly rotating shaft, a plunger operated by said shaft there being a gap between said plunger and said contact operating device, said movable member serving to close said gap, and means for holding the contact closing device closed for a predetermined period of time.

70. The combination with a member movable in response to a change of a circuit closing member, a source of mechanical power normally disconnected from said circuit closing member, said movable member serving as a connection between said source of power and said circuit closing member, a periodically operated member controlled by said source of power and adapted to engage said movable member to operate the circuit closing member during one periodical actuation thereof, and means for holding said circuit closing member closed during said period and means for releasing said holding means only during a subsequent period.

71. In combination, a member movable in response to a change, a periodically operating plunger, a circuit closing member adapted to be selected by said movable member and actuated by said periodically operating member, means for holding said circuit controlling member closed during the period of actuation and means for releasing said circuit controlling member only during a subsequent period of action.

72. In combination, a movable pointer, a circuit closing plunger, a contact controlled by said plunger, a detent for holding said plunger in actuated position, an operating plunger actuated periodically, said movable pointer serving as a connecting link between the operating plunger and the circuit closing plunger, said detent member being adapted to hold the circuit closing plunger closed during a complete period of the actuating plunger and releasing means for the detent means capable of actuation only on a subsequent period of operation of the operating plunger.

73. The combination with a member movable in response to a change, of an electro-responsive device, a source of current normally disconnected from said device, means for coupling said source of current with said electro-responsive device in suitable strength and direction, and a periodically operating member controlled by said movable member for controlling said coupling means.

74. The combination with a member movable in response to a change, of an electro-responsive means, a normally open path between a source of current and said responsive means, path closing means for connecting the source of current in suitable strength and direction to said responsive means, and a periodically operating member controlled by said movable member for controlling said path closing means.

75. The combination with a member movable in response to a change to be indicated, of an electro-responsive indicator, a source of electric current, a periodically operating member adapted to engage said movable member, and coupling means controlled by said periodically operating member for controlling the connection between said source of current and said indicator.

76. The combination with a member movable in response to a change to be indicated, of an electro-responsive indicator, a source of current, a plurality of switching means for connecting the electro-responsive indicator to the source of current for predetermined periods of time, means controlled by said switching means governing the direction and strength of current flow to said electro-responsive indicator, said movable member governing said means, and a periodically actuated member for actuating said switching means.

77. The method of creating a secondary action in response to a primary variable action by means of an electric circuit which comprises closing the circuit for predetermined short periods of time and varying the strength of the current in accordance with the differential of variation of the primary action with respect to said short periods of time.

78. The method of creating a secondary action in response to a primary variable action by means of an electric circuit which comprises closing the circuit for predetermined short periods of time and varying the strength and direction of current in accordance with the value of the differential of increase or decrease of the primary action with respect to said short periods of time.

79. In a regulator for keeping a given phenomenon constant, a pointer occupying a definite balancing position for the desired constant phenomenon, a suitable regulating mechanism, an electro-responsive device for moving said regulating device in either direction when the pointer is deflected until the pointer is brought back to its balanced position, a circuit closer governed by the position of the pointer for actuating said electro-responsive device to cause said regulating device to be suitably varied, means for periodically testing for the position of the pointer with regard to said circuit closer at equal intervals of time, means for holding said circuit closers in closed position and common means for releasing the said circuit closers when the point returns to its balanced position.

80. In a regulator, a rheostat with an arm movable simultaneously with the regulating mechanism such as a valve, damper, float, etc., an electro-responsive device for causing said arm and mechanism to be moved in either direction, another resistance varied by the controlling factor, a galvanometer governed by the relation between the rheostat and the controlling resistance, a circuit closer governed by the position of the galvanometer pointer for actuating said electro-responsive device to cause said balancing rheostat to be suitably varied, means for periodically testing for the position of the galvanometer pointer with regard to said circuit closer at equal intervals of time, means for holding said circuit closers in closed position and means releasing said circuit closer when the galvanometer reads zero.

81. In an ohmmeter, an electrical circuit connected so as to satisfy any method of resistance measurement depending upon either a galvanometer or differential galvanometer pointer being brought to zero before the unknown resistance can be determined, a galvanometer governed by the resistance of the electric circuit balancing resistance, an electro-responsive device for varying said balancing resistance until the galvanometer is brought to zero, a circuit closer governed by the position of the galvanometer pointer for actuating said electro-responsive device to cause said balancing resistance to be suitably varied, means for periodically testing for the position of the galvanometer pointer with regard to said circuit closer at equal intervals of time, means for holding said circuit closers in closed position and common means for releasing said circuit closer when the galvanometer reads zero.

In witness whereof I hereunto subscribe my name this 3rd day of April A. D. 1920.

JOHN A. OBERMAIER.